United States Patent [19]

Borisch et al.

[11] Patent Number: 4,536,849

[45] Date of Patent: Aug. 20, 1985

[54] MACHINE OPERATION MONITOR

[75] Inventors: Donald J. Borisch, Cincinnati; Gary V. Hanrahan, Mason; Herbert E. Merritt, Cincinnati, all of Ohio

[73] Assignee: Cincinnati Milacron Inc., Cincinnati, Ohio

[21] Appl. No.: 415,811

[22] Filed: Sep. 8, 1982

[51] Int. Cl.³ .............................................. G06F 15/46
[52] U.S. Cl. .................................... 364/550; 364/474; 364/475; 364/184; 364/507; 324/73 R
[58] Field of Search ............... 364/550, 551, 487, 474, 364/475, 506, 507, 184; 340/680; 324/73 R

[56] References Cited

U.S. PATENT DOCUMENTS

| | | | |
|---|---|---|---|
| 4,207,567 | 6/1980 | Juengel et al. | 340/680 |
| 4,231,106 | 10/1980 | Heap et al. | 364/474 X |
| 4,246,577 | 1/1981 | Shima et al. | 340/680 |
| 4,251,872 | 2/1981 | Bone | 364/551 |
| 4,260,986 | 4/1981 | Kobayashi et al. | 340/680 |
| 4,314,329 | 2/1982 | Crewe et al. | 364/474 X |
| 4,326,257 | 4/1982 | Sata et al. | 364/474 X |
| 4,366,544 | 12/1982 | Shima et al. | 364/550 |
| 4,370,705 | 1/1983 | Imazeki et al. | 364/474 X |
| 4,432,064 | 2/1984 | Barker et al. | 364/550 |
| 4,456,960 | 6/1984 | Wakai | 364/507 X |

Primary Examiner—Edward J. Wise
Attorney, Agent, or Firm—John W. Gregg

[57] ABSTRACT

A machine operation monitor is provided for detecting malfunctions during execution of a machine cycle of operation irrespective of the activity being performed. Load levels of machine member driving means are periodically sampled and compared against limits computed by the monitor. The limit calculation uses net force or torque measured by storing load level samples during two preparatory executions of the machine cycle of operation. During the first execution a finished workpiece is produced using good tools. During the second execution no workpiece is present. The differences between load level samples taken during these two executions represent the net force required to perform work on the workpiece. The monitor responds to synchronization signals to maintain correspondence between load level samples taken in successive executions of the machine cycle. The monitor also responds to monitor off signals to suspend monitor operation during periods of no activity in the machine cycle.

10 Claims, 15 Drawing Figures

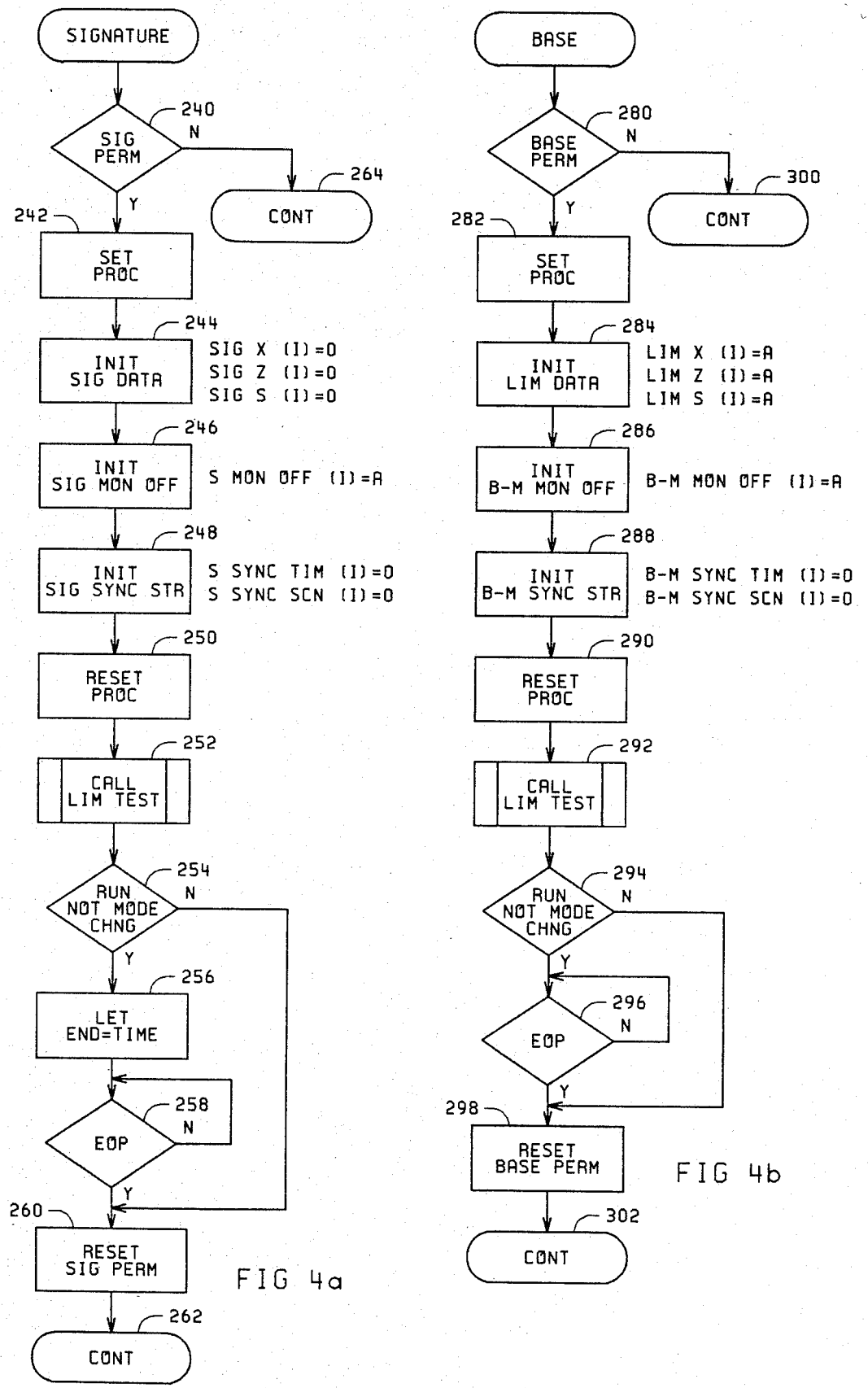

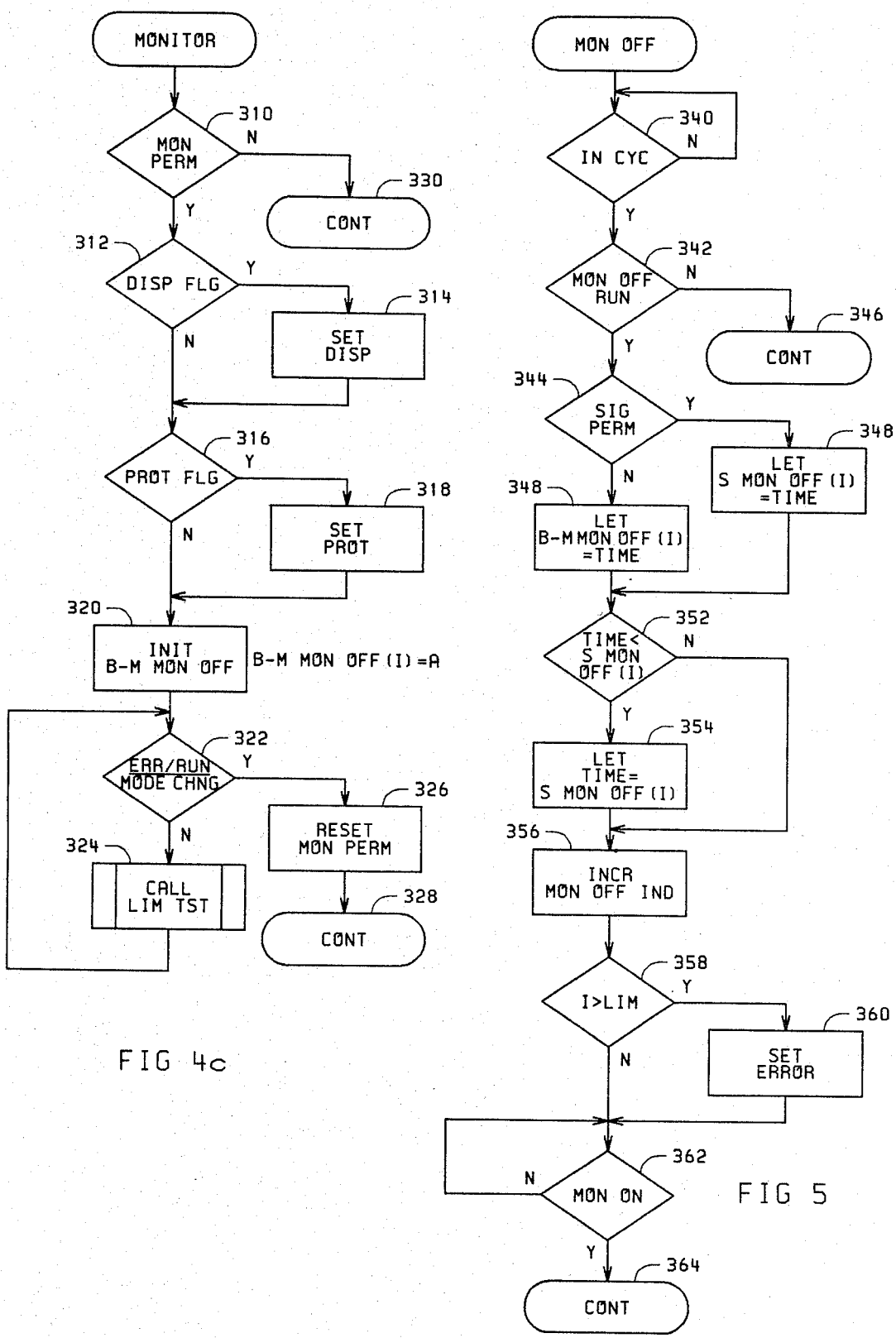

MACHINE OPERATION MONITOR

BACKGROUND OF THE INVENTION

This invention relates generally to monitoring the operation of a machine. In particular this invention relates to the automatic detection of extreme loads on driven members whether machine slides or spindles during the execution of a machine cycle of operation.

Historically, where the object of machine operation monitoring is operation control, forces or torques are monitored during program periods when work is expected to be performed on a workpiece. It is well-known for example to monitor torque during drilling operations to control feed rate and prevent tool breakage. Likewise, it is well-known to monitor force during grinding operations to control feed rate to produce accurate finished workpieces. Further, where the primary object of monitoring is the detection of worn or broken tools, it is known to detect peak power during a machine cycle and compare changes in peak power from one machine cycle to another against a predetermined limit. When the change in power exceeds a limit, an error or alarm is produced indicating an excessively worn or broken tool. It is known to record a profile of tool wear occurring over the execution of a plurality of machine cycles of operation and to use this profile to produce limits for detecting excessively worn or broken tools during monitored executions of the machine cycle. It is also known to store a measured load level in correspondence to the positioning of a selected machine slide or slides to a predetermined location. Tool wear or breakage is detected during subsequent executions of the machine cycle of operation by comparing measured load levels at the same selected position against the recorded value. These known monitors are all practically limited in applicability to loads detected during the performance of work on a workpiece. Further, these known monitors are intended to compare a measured force typically a gross force of a single driven machine member against a recorded value using a dedicated algorithm for determining the magnitude of the acceptable measured load.

It is, therefore, one object of this invention to provide a machine operation monitor for detecting load extremes occurring during a cycle of operation irrespective of the programmed activity at the moment of occurrence.

It is a further object of the present invention to provide a machine operation monitor for detecting extreme loads during a cycle of operation at moments when the programmed activity does not involve contact between a workpiece and tool.

It is a still further object of the present invention to provide a machine operation monitor for detecting extreme loads occurring during a cycle of operation from any of a plurality of machine member driving means.

It is a still further object of the present invention to provide a machine operation monitor for detecting extreme loads occurring during a cycle of operation which includes means for computing load limit values corresponding to machine cycle activity occurring at periodic intervals.

It is a still further object of the present invention to provide a machine operation monitor for detecting extreme loads occurring during a cycle of operation which includes means for computing load limit values according to a single algorithm based on net load applicable to loads measured at any and all of the machine member driving means.

Other objects and advantages of the present invention will become apparent from the following description.

SUMMARY OF THE INVENTION

A machine operation monitor is provided for detecting extremes of machine driving member loads occurring during a cycle of operation. Force from all machine slide and torque from all spindle drives are monitored and samples are periodically taken. Two preparatory executions of the cycle of operation are completed prior to executing cycles under control of the monitor. During the first execution, a workpiece is finished to an acceptable tolerance using good tools and load samples are stored to establish the expected machining load levels. During the second execution no workpiece is present and no machining is done and samples are stored to establish the load levels required to execute the program cycle of operation. Limit values are then computed for each periodic interval and sample load levels taken during subsequent executions of the machine cycle are compared against limit values. When a sample value exceeds a limit value, an output is set to effect safe interruption of the machine cycle.

BRIEF DESCRIPTION OF THE DRAWINGS

FIGS. 4a, 4b, and 4c are flow charts of the mode control routines of FIG. 2.

FIG. 5 is a flow chart of the routine for accommodating monitor inhibit commands.

DETAILED DESCRIPTION OF THE PREFERRED EMBODIMENT

For purposes of illustration, a machine operation monitor as implemented using a programmable controller will be described in some detail. The programmable controller is used in connection with the control of a machine tool for purposes of controlling the operation of discrete machine mechanisms not directly controlled by the machine tool numerical control. Such mechanism include, for example, the spindle motor drive, the tool change mechanism, and tool storage mechanism. The machine monitor to be described is available from Cincinnati Milacron Inc. the assignee of the present invention. It is to be understood that the machine operation monitor may as well be implemented as part of a numerical control or by means of any other suitable programmable controller or programmable processor having at least a limited computational ability.

Figure 1:
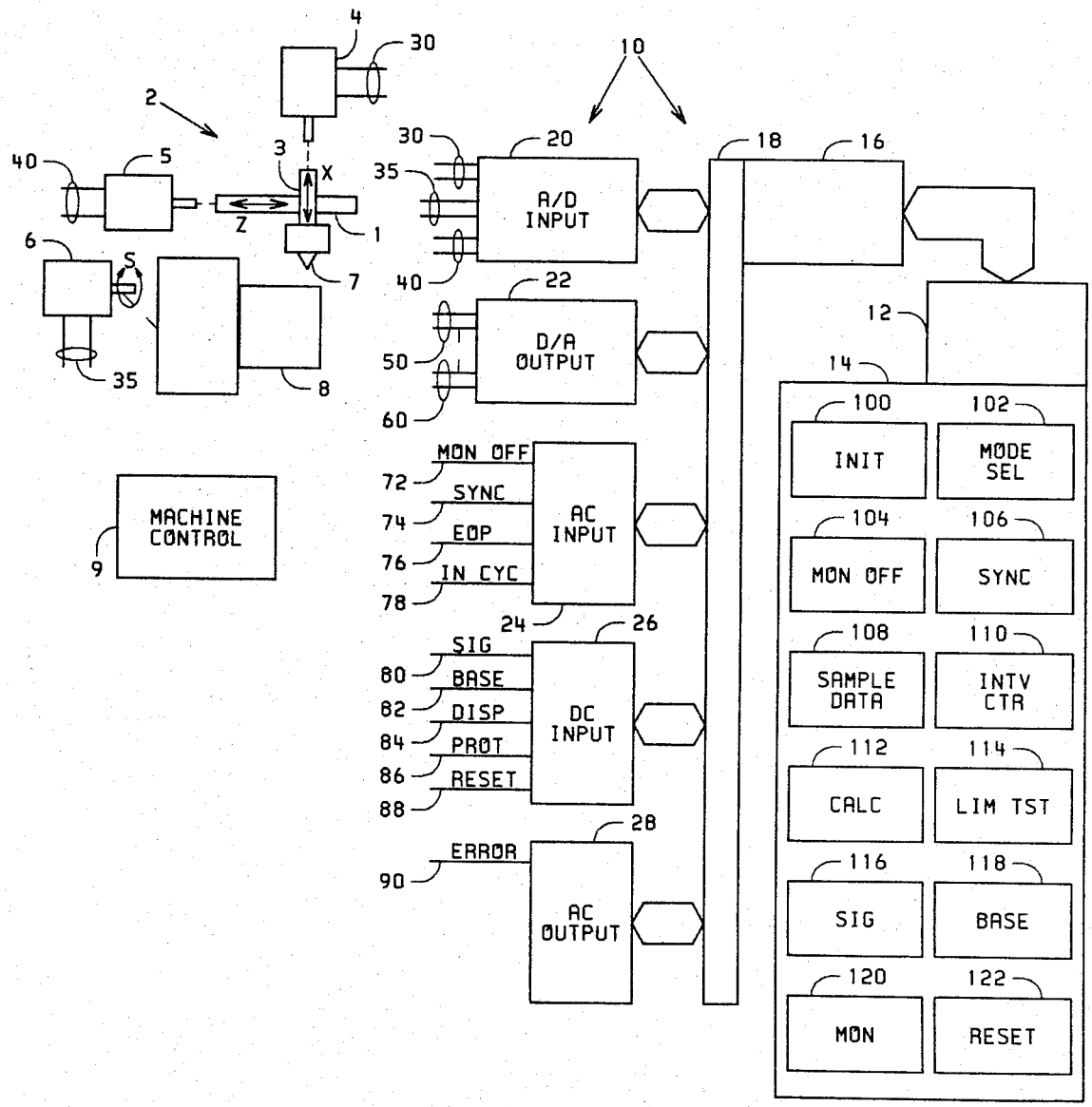
FIG. 1 is a block diagram of the machine operation monitor together with a schematic of a machine.

Referring to FIG. 1, a block diagram of the machine operation monitor shall be described. The machine operation monitor indicated generally as 10 includes a processor 12 incorporating the programmable controller operating system programs, and a user memory 14 wherein are stored the machine operation monitor control programs. The processor 12 communicates with input and output devices through an input/output bus 18 by means of a bus adapter 16. The bus adapter transfers the data words from the processor to the identified input/output interface module such as modules 20 through 28. The modules 20 through 28 plug into the I/O bus 18 and are connected thereto for bidirectional communications with the processor 12 through the bus adapter 16. Input module 20 is an analogue-to-digital converter which receives a monitored parameter signal of a machine driven member driving means such as for example, the slide drive motor current on input lines such as those as indicated by pairs 30 and 40. The monitored signal is chosen to represent the level of the load such as force or torque being effected by the driving means. Actual input signals to input module 20 are voltages which may represent motor voltage or current or in the case of a spindle, the spindle speed. The analogue signals are filtered by low pass filters and converted to digital load level signals by the A to D converter of input module 20 and are transferred upon request from processor 12 through I/O bus 18 and bus adapter 16. Output module 22 is a digital-to-analogue converter that produces analogue signals for driving a panel meter to display the percentage of limit of a measured load level for each monitored channel. The output display information is received as a digital signal and converted to analogue by the digital-to-analogue converter of output module 22 and then applied on output lines such as pairs 50 and 60. Input module 24 accepts machine voltage level alternating current inputs and interfaces those to levels suitable for use by the programmable controller. Input module 24 is shown providing an interface for four control signals produced by the machine numerical control 9. Included are the monitor off signal on line 72, the synchronization signal on line 74, the end of program signal on line 76 and the in cycle signal on line 78. Input module 26 is used to interface low level direct current signals to the programmable controller. Such signals may be produced on the machine operation monitor control panel and include input signals from the monitor push buttons on lines 80 through 88. Included in these push button signals are the mode select signals from mode select push buttons (not shown) including the signature mode on line 80, the base mode on line 82, the display mode on line 84 and the protect mode on line 86. In addition, the monitor reset push button input signal is on line 88. Output module 28 provides the machine voltage level alternating current signal for signalling the machine control that a sampled load level has exceeded a limit. This error output signal is provided on line 90.

The programmable controller operating system program effects poling of user programs in the sequence indicated by their appearance in a program list. Instructions of a selected program are executed until that program execution is suspended waiting the occurrence of a programmed condition or for a programmed delay interval. In this fashion, instructions from a plurality of the machine operation programs can be executed by the programmable controller as it proceeds through or scans the list of programs. It will be understood by those skilled in the art that a totally equivalent control of the machine operation monitor could be achieved by an interrupt driven scheme of subroutine processing. Programs stored in the user memory 14 for controlling the operation of the machine operation monitor include: initialization routine 100; mode select routine 102; monitor off routine 104; synchronization routine 106; sample data routine 108; reference counter routine 110; limit calculation routine 112; limit test routine 114; signature load routine 116; base load routine 118; monitor routine 120; and reset routine 122. Details of the monitor programs shall be described subsequently.

Also shown in FIG. 1 is a schematic of a typical machine 2, a cycle of operation of which is to be monitored. A workpiece 8 is mounted to a spindle driven by driving means 6 such as a spindle drive motor. Spindle driving means load level and speed analogue signals are input to input module 20 by wire bundle 35. A tool 7 is moved relative to the workpiece by means of two slides 1 and 3 driven respectively by slide driving means 5 and 4. The slide 1 is designated as the machine Z axis producing tool motion in the directions indicated by the horizontal double ended arrow. Input signals from driving means 5, which may be a motor for rotating a slide drive screw, are identified as Z channel load level signals. The slide 3 is identified as the X axis and provides relative tool motion in the directions indicated by the vertical double ended arrow. Input signals from driving means 4 are identified as X channel load level signals. Spindle speed and slide positions are controlled by machine control 9 which executes a predefined program of operation of the machine. It is to be understood that the monitor is equally applicable to other machine configurations.

Figure 2:
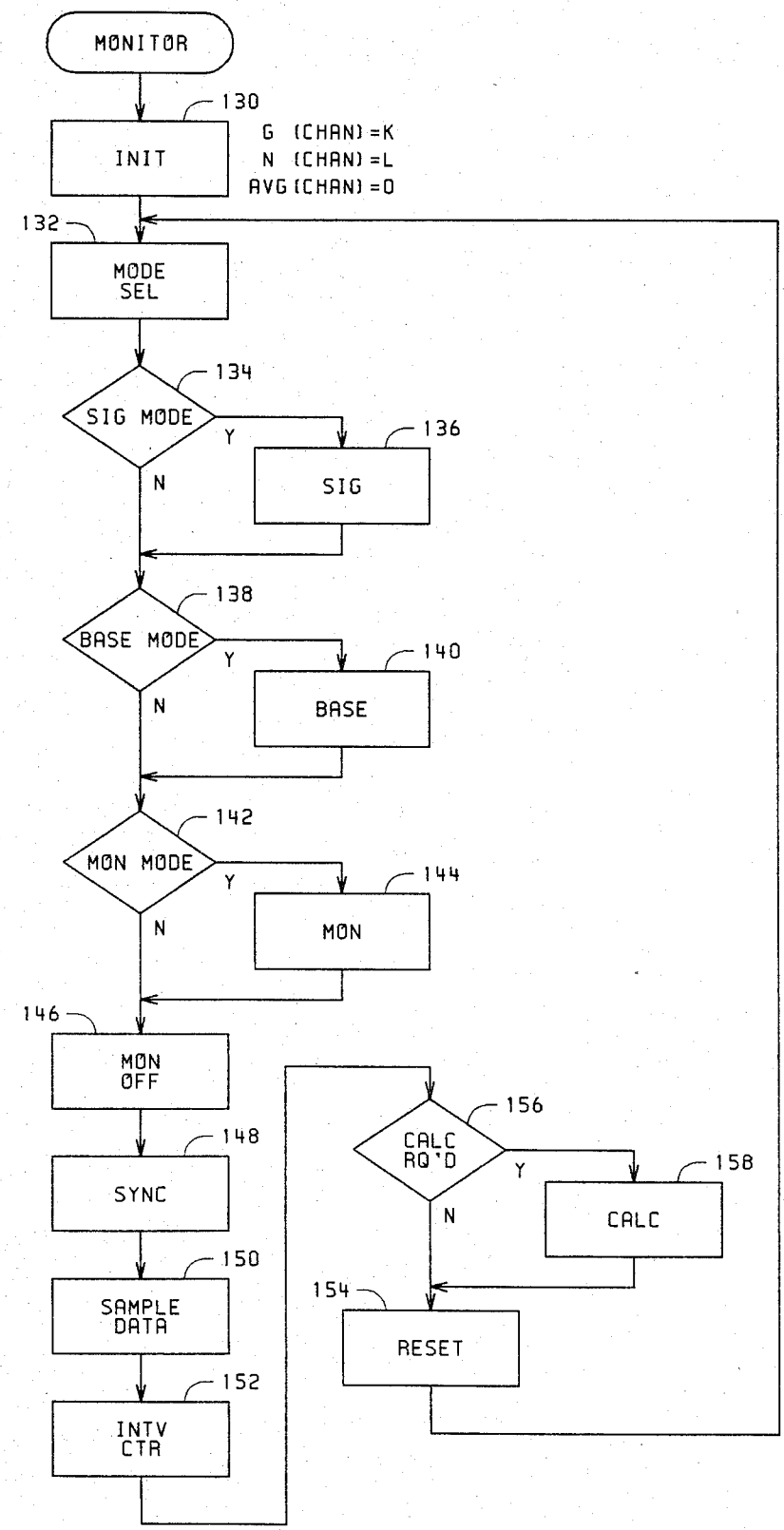
FIG. 2 is a flow chart of the overall cycle of operation of the monitor.

Referring to FIG. 2, the overall cycle of operation of the machine operation monitor shall be described. Beginning at process step 130 following activation of the programmable controller, the monitor initialization program 100 is executed. This routine initializes variable values to be used by the other monitor programs. Following execution of the initialization program 100 the process continues at process step 132 where the mode select routine 102 is executed. The mode select routine effects the setting of a permission signal for the monitor mode of operation identified by the selected push button on the monitor control panel. Only a single mode permission is active at any one time. At decision step 134 the signature permission is tested and if true, the signature load routine 116 is executed at process step 136. If the signature permission is not true, then the overall monitor operation procedure continues at decision step 138 where it is determined whether or not the base permission is true and if so, processing continues with the execution of the base load routine at process 140. In a similar fashion, decision step 142 determines whether or not the monitor permission is true, and if so, monitor processing continues at process step 144 where the monitor load routine 120 is executed. Following execution of a selected mode processing routine, or if no mode had been selected, following execution of decisions steps 134, 138, and 142, the monitor processing continues at process step 146 wherein the monitor off processing routine 104 is executed. The monitor off processing routine responds to the activation of a monitor off signal on line 72. It is contemplated that the machine cycle of operation will incorporate periods of no activity during which it is undesirable to continue operation of the monitor. Therefore, the machine tool program may include monitor off codes to effect energization of the monitor off signal on line 72. As long as the monitor off signal is active, the periodic sampling of loads of the machine drive means is suspended. Following execution of the monitor off processing routine, the monitor operation processing continues at process step 148 where the synchronization routine 106 is executed.

As previously stated, the calculation of load limit values is dependent upon load samples taken during an execution of a cycle of operation when no machining is performed and an execution of the cycle of operation when an acceptable workpiece is finished using good tools. It is expected that the execution time of a programmed machine cycle of operation will vary depending on the response time of machine mechanisms and the actual machine load. Consequently, to synchronize the values of load level samples taken during different executions of the machine cycle of operation it is necessary to provide the monitor with synchronization commands derived from the machine cycle of operation program. The synchronization routine insures that comparisons of sample values against limit values correspond to execution of the same machine activity.

Following execution of the synchronization routine 106, the monitor operation processing continues at process step 150 where the sample data routine 108 is executed. The sample data routine samples the digital load level signals from the input module 20 representing the load level of the selected machine member driving means. The data sample routine averages the levels of the last ten data samples taken for each monitored driving means.

Following execution of the data sample routine 108, monitor operation processing continues at process step 152 where the periodic interval counter is serviced. In normal operation, data samples are taken once for each scan through the monitor operation programs which occurs on a 100 millisecond basis. During the execution of signature load and base load routines while the machine executes its cycle of operation, average values for ten consecutive samples are stored in storage locations arranged in arrays within memory 14. The interval counter routine 110 identifies the monitor operation scan as well as the stored values by counting scans to produce periodic interval signals for controlling the sampling and storing functions. The counter values are used as pointers into arrays of stored samples and limits.

Following execution of the interval counter routine 110, monitor operation processing continues at decision step 156 where need for executing a limit calculating routine is determined. Decision step 156 determines that the signature load and base load routines have been completed and that data exists to calculate limit. When these conditions are met the calculation routine 112 is executed by process step 158. The calculating routine produces limit signals in response to the signature and base load level signals, each limit signal representing a load level defining an acceptable maximum load level or a storage time interval.

Following execution of the calculation routine, overall monitor operation processing continues at process step 154 which executes a reset input processing routine. This program, which will not be described in detail, responds to an active input on line 88 and resets the error output signal activated by the operation of the monitor. Following execution of the reset processing routine 122 at process step 154, the overall monitor operation is continued at the processing step 132 by the return line. In this fashion, the monitor operation is continuous so long as the programmable controller is left in a run condition.

Figure 3A:
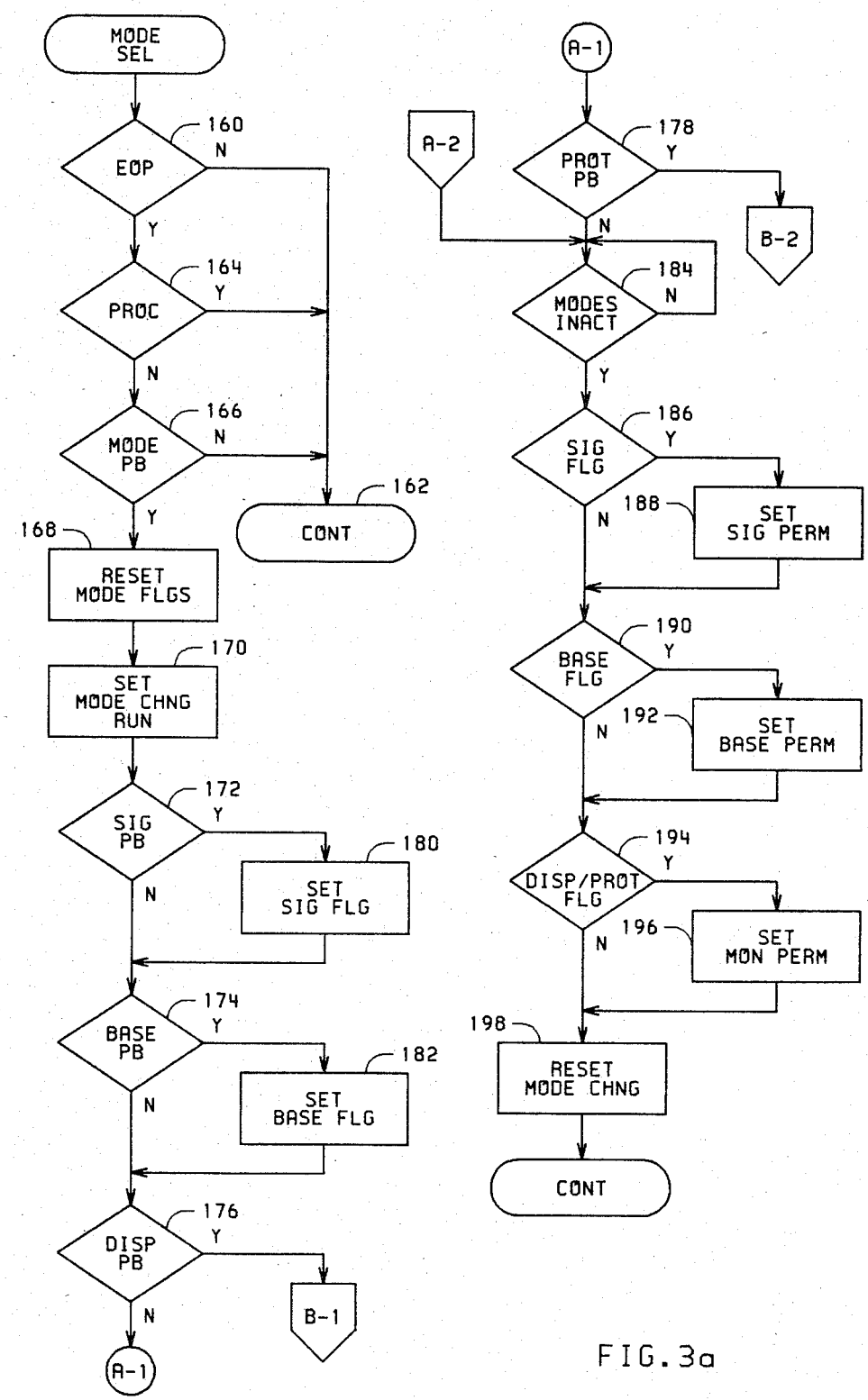
FIGS. 3a and 3b are flow charts of the mode select routine of FIG. 2.
Figure 3B:
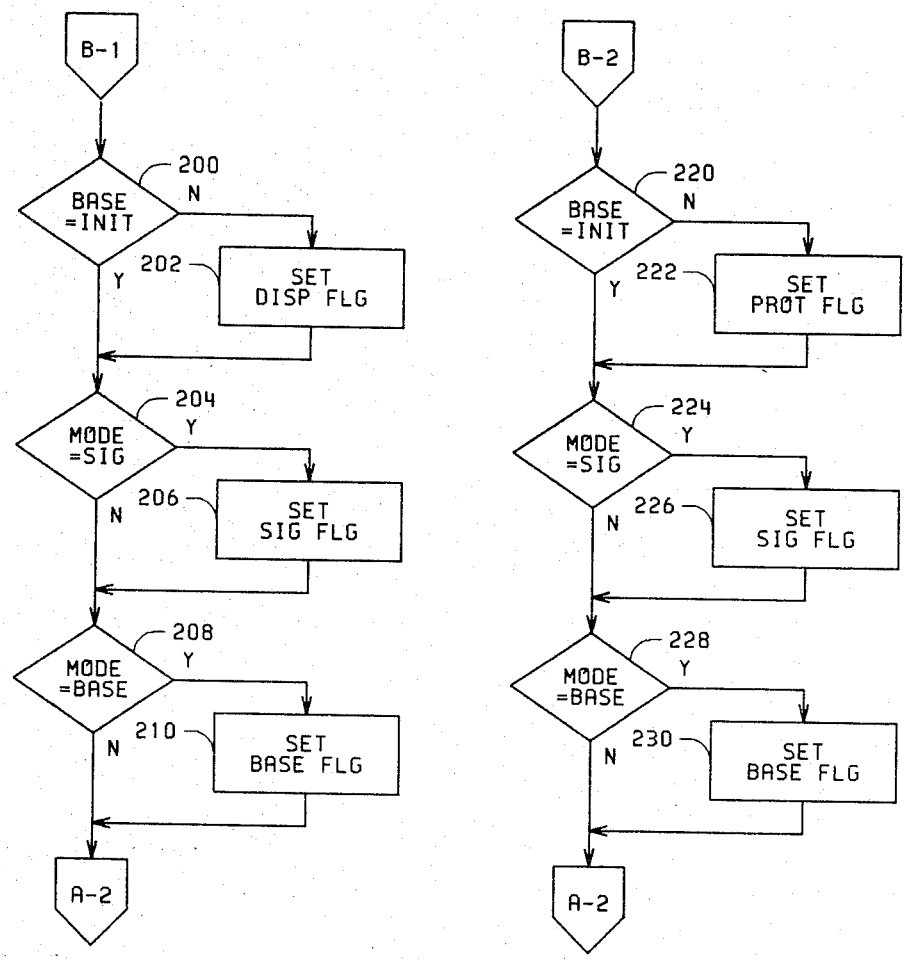

Referring now to FIGS. 3a and 3b, the mode select routine 102 shall be described in detail. Beginning at decision step 160, it is determined whether or not the end of program of the machine cycle of operation has been reached. This is indicated by the input on line 76 to the AC input module 24 of FIG. 1. If the machine is currently executing its cycle of operation, and the end of program has not been reached, then a mode change is not permitted and the overall operation of the monitor continues through terminal 162 to the first of the active mode decision steps 134, 138 and 142 of FIG. 2. If the end of program has been reached, the processing of the mode select routine continues at decision step 164 where it is determined whether or not the monitor is currently processing data. If it is, then a mode change is not permitted and overall monitor operation is continued through terminal 162. If, however, the monitor is not currently processing data, then the mode select processing routine continues at decision step 166 where it is determined whether or not a mode push button on the monitor control panel is active. If it is not, again, the monitor operation processing is continued through terminal 162. If a mode push button is currently active as determined by the signals produced on the input to direct current input module 26 then mode select processing continues at process step 168.

Process step 168 resets all mode select flags. Thereafter, at process step 170, a mode change is indicated by setting the mode change variable to the true condition. Beginning at decision step 172, and continuing through decision steps 174 through 178, it is determined which of the mode push buttons is active. If the signature push button is active, then process step 180 sets the signature flag true. If decision step 174 determines that the base push button is active, then process step 182 sets the base flag true. If decision step 176 determines that the display push button is active, then processing continues through the off page connector B1 to decision step 200. If decision step 178 determines that the protect push button is active, then mode select routine processing continues through the off page connector B2 to decision step 220 of FIG. 3b. The display and protect push buttons permit activation of machine monitoring in either a display only mode where the percent of limit is displayed on the monitor control panel or in a protect mode where the error output signal may be activated in response to a sampled load level exceeding a calculated load level limit signal. The monitor mode is not permitted until the base load processing has been completed. Therefore, at decision step 200 and 220 the base data array is tested against initialization values to determine whether or not base load level data has been loaded into the arrays. If the base load arrays are not equal to their initialization values, then the appropriate monitor mode flag may be set by process steps 202 or 222, respectively.

Continuing now with reference to FIG. 3a, decision step 184 effects the suspension of mode select routine processing until the currently active mode is made inactive. When all modes are off, the mode select processing continues through decision steps 186, 190 and 194 to determine which of the mode select flags has been set. If decision step 186 determines that the signature flag has been set, then mode select processing continues at process step 188 where the signature permission is set true. If decison step 190 determines that the base flag has been set, then the mode select processing continues at process step 192 where the base permission is set true. If decision step 194 determines that either the display or protect flag has been set, then mode select processing continues at process step 196 where the monitor permission is set true. Thereafter, the mode select processing continues at process step 198 where the mode change variable is reset. Overall monitor operation processing is continued through terminal 232 to bring the monitor operation processing to process step 146 of FIG. 2.

Referring now to the flow charts of FIG. 3b, as has already been stated, the display and protect push buttons select the monitor mode and the monitor mode is not enabled unless the base routine has been executed. Therefore, if decision step 200 determines that the base array data is equal to its initialization value the processing would continue at decision step 204 where it is determined whether or not the current active mode is the signature mode. If it is, then the signature flag is set by process step 206. If the signature mode were not the current active mode, then processing would continue at decision step 208 where it is determined whether or not the current active mode is the base mode, and if so, process step 210 sets the base flag true. Following execution of this portion of the routine the mode select processing would be continued by the off page connector A2 at decision step 184 of FIG. 3a. In a totally similar fashion, decision step 224 and process step 226 of FIG. 3b effect the setting of the signature flag and decision step 228 and process step 230 effect the setting of the base flag in the event that the activated push button were the protect push button, and the base routine had not been executed.

Referring now to FIG. 4a, the signature load routine 106 shall be described in detail. Beginning at decision step 240, it is determined whether or not the signature routine permission is true. If not, overall monitor operation is continued through terminal 264. If the signature routine permission is true, then signature processing continues at process step 242 where the processing variable is set true. At process step 244, the signature data arrays are initialized through use of the array index so that all signature load level stores data are set equal to zero. At process step 246, the signature monitor off data array is initialized by means of an array index. All monitor off time data stores are initialized to an arbitrary large value. At process step 248, the signature synchronization storage arrays are initialized. These include synchronization time storage for both the scan count and the data store or time count. These arrays are initialized to zero through use of the array index. At process step 250, the processing variable is reset. At process step 252, the limit test procedure is called. By means of this subroutine call, signature routine processing is suspended until completion of execution of the limit test routine.

Upon completion of the limit test routine processing, signature routine processing continues at decision step 254 where it is determined whether the termination of execution of the limit test routine was in response to the deactivation of the run signal or the activation of the mode change signal. The limit test routine processing will terminate if the error output signal is activated or if the run signal has been reset or the machine cycle of operation has reached the end of program. If decision step 254 determines that run is still active and mode change has not been set, then the termination of the limit test routine processing must be in response to either the end of program or the setting of the error output. In either event, at process step 256, the end variable is set equal to the current time and the signature routine processing is suspended by decision step 258 which waits for the occurrence of the end of program signal. In the event that the run variable is false or mode change is active, then processing of the signature routine skips the process step 256 and decision step 258 and goes immediately to process step 260 where signature permission is reset. Thereafter, monitor operation is continued through terminal 262 at process step 146 of FIG. 2.

Referring now to FIG. 4b, the base load routine 118 shall be described in detail. At decision step 280, it is determined whether or not the base load routine permission has been set. If not, overall monitor operation processing continues through terminal 300 at process step 146 of FIG. 2. If the base permission is true, then base load routine processing continues at process step 282 where the processing variable is set true. At process step 284 the load level limit data store array is initialized to an arbitrarily large value through the data array index. At process step 286, the base-monitor, monitor off array store is initialized to the arbitrarily chosen large value through the base monitor off array index. At process step 288, the base-monitor synchronization store arrays are initialized to zero through the synchronization store indices. At process step 290, the processing variable is reset. At process step 292, the limit test routine 114 is called. The call to the limit test routine of process step 292 suspends execution of the base load routine processing until termination of the limit test processing. Thereafter, the base load routine processing resumes at decision step 294 where it is determined whether or not the run variable is true and mode change is not active. As before, if run is active and mode change is not, processing continues at decision step 296 which forces the base routine processing to wait until an end of program occurs. Thereafter, processing continues at process step 298 where the base load routine permission is reset. In the event that decision step 294 had produced a false result, then the wait of decision step 296 would be skipped and base load routine processing would have continued directly at process step 298. Following the resetting of the base routine permission, the overall monitor operation processing is continued through terminal 302.

Referring now to FIG. 4c, the monitor routine 120 shall be described in detail. Beginning at decision step 310, the monitor routine permission is tested to determine whether or not it is true and if it is not, overall monitor operation processing is continued through terminal 330 at process step 146 of FIG. 2. If the decision step 310 determines that the monitor permission is true, then monitor routine processing continues at decision step 312 where the display flag is tested for a true condition. If the display flag is true, process step 314 sets the display mode true. At decision step 316, the protect flag is tested and if found true, process step 318 sets the protect mode. In either event, processing continues at process step 320 where the base-monitor, monitor off array is initialized to the arbitrarily chosen large value through the array index. Following process step 320, decision step 322 determines whether or not the error output has been set or run has been deactivated or mode change has been activated. If any of these conditions is true, then monitor routine processing continues at process step 326 where the monitor routine permission is reset. Thereafter overall monitor operation processing continues through terminal 328. If none of the conditions tested for at decision step 322 are true, then monitor routine processing continues at process step 324 which calls the limit test routine. By this call, the monitor routine processing is suspended until termination of the limit test routine. Monitor routine processing continues around the loop to decision step 322 upon completion of limit test routine processing.

It should be understood by those skilled in the art, that the mode routine processing for any active mode involves primarily initialization of mode variable arrays with subsequent execution of the limit test routine. As execution of active monitor programs is completed on a scan basis, it will be apparent that the suspension of mode routine processing effects transfer of processing to the limit test routine. Thus, in the normal operation data samples are taken for each scan, averaged, and when the display or protect modes are active, tested by execution of the limit test routine. This processing continues so long as the machine cycle continues to be executed. Once the machine cycle of operation reaches its end of program, the mode processing terminates in a natural fashion shortly thereafter.

The monitor off routine 104 shall be described with reference to FIG. 5. The monitor off routine is used to mark the time at which monitor off signals on input line 72 of input module 24 of FIG. 1 are received and to effect suspension of processing of the interval counter routine 110 during the monitor off period. Thus, data sampling is effectively suspended until the monitor off condition is deactivated. Monitor off routine processing begins at decision step 340 where processing waits until the machine cycle of operation has begun. Thereafter, at decision step 342, it is determined whether or not the monitor off input on line 72 of input module 24 has been activated during a time when the run variable is true. If so, processing continues at decision step 344. If not, overall monitor operation continues through terminal 346. At decision step 344, it is determined whether or not the signature permission is true, and if so, process step 348 stores the current value for time in the signature monitor off array location indicated by the array index.

If decision step 344 determines that the signature permission is not true, processing continues at process step 350 where the current value of time is loaded into the base-monitor, monitor off array location indicated by the array index. Thereafter, at decision step 352, it is determined whether or not the current value of time is less than the value stored in the signature monitor off array indicated by the array index. This test determines whether or not the occurrence of the monitor off is at a lesser time value than was recorded during the execution of the machine cycle of operation in the signature mode. A true determination at decision step 352 indicates that the current execution of the machine cycle of operation is running ahead of or faster than the signature run and therefore, process step 354 sets the current value of time equal to the value stored in the signature monitor off array.

If decision step 352 determines that the current value of time were not less than the value in the signature monitor off array, then process step 354 would be skipped and monitor off routine processing would continue at process step 356 where the monitor off array index is incremented. At decision step 358, the monitor off array index is tested against its associated limit for the maximum permitted number of occurrences of the monitor off signal. If it is greater than its limit value, then from the yes side of decision step 358, processing continues at process step 360 where the error flag is set. As long as the index is less than its limit value, processing would continue on the no side of decision step 358 to decision step 362 which establishes a wait condition for the monitor off signal to be deactivated indicating that monitor operation is to be reactivated. Following the deactivation of the monitor off signal the monitor off routine processing is complete and monitor operation processing is continued through terminal 364 to continue the overall operation at process step 148 of FIG. 2.

Figure 6A:
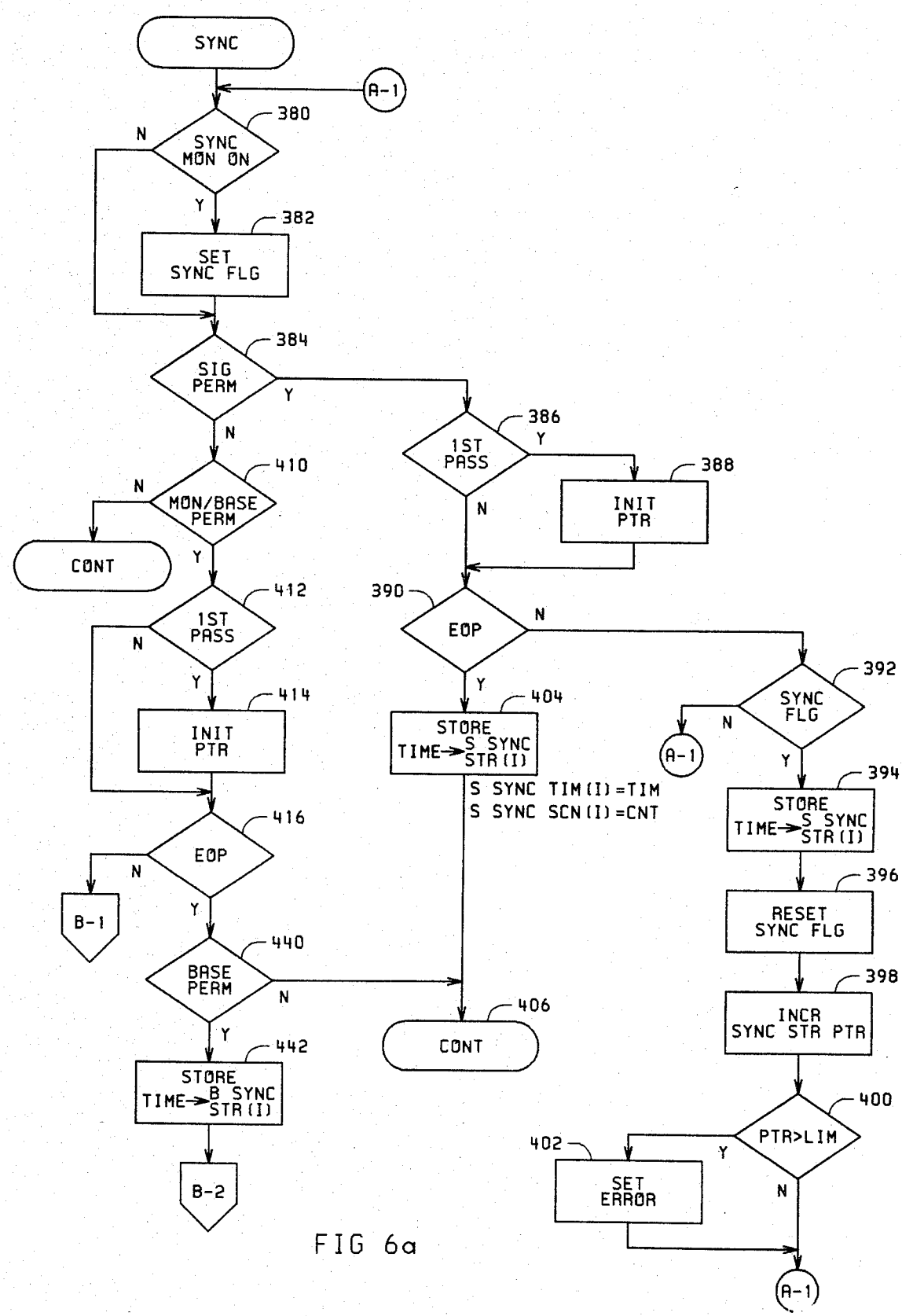
FIGS. 6a and 6b are flow charts of the synchronization routine of FIG. 2.
Figure 6B:
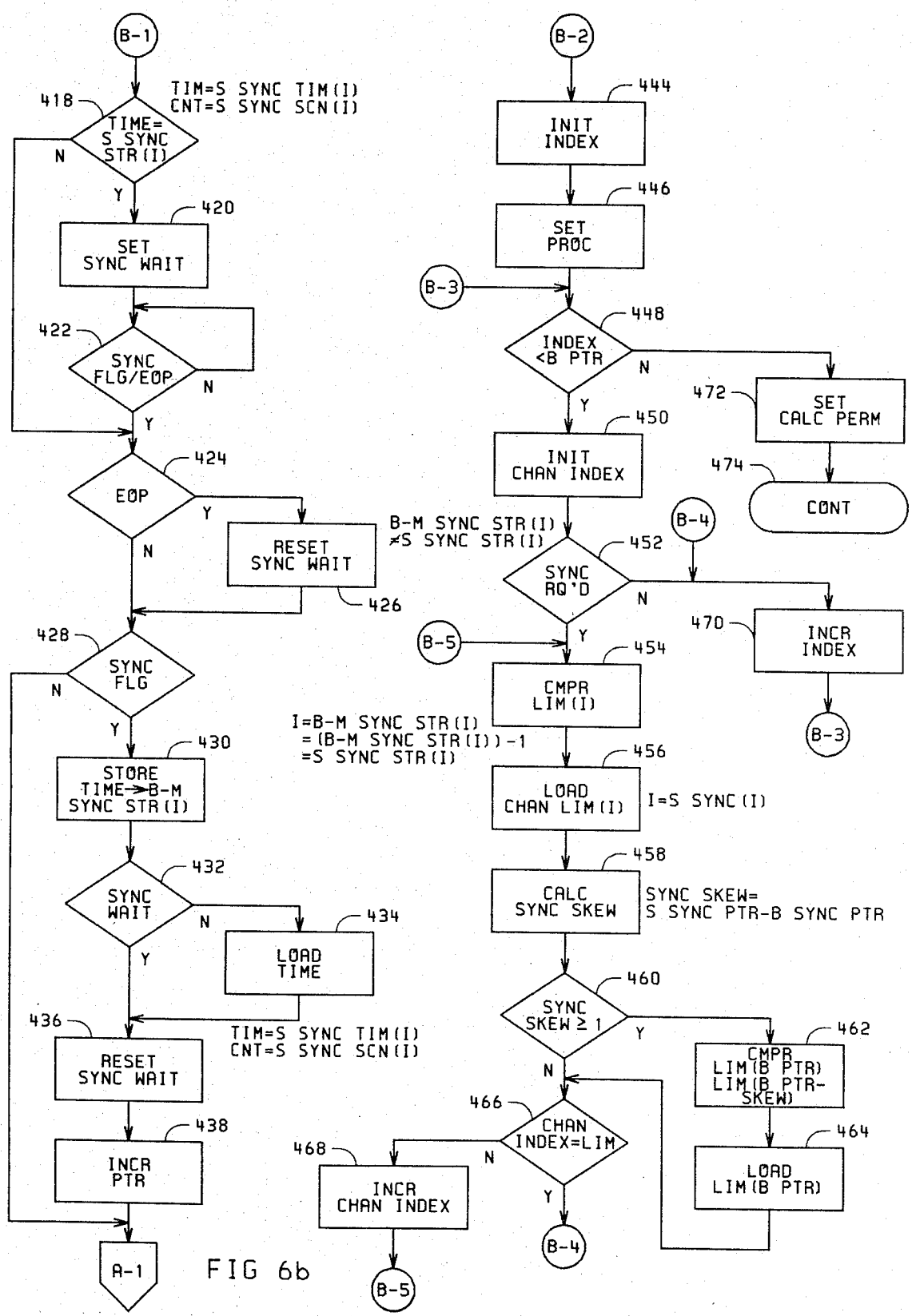

Referring now to FIGS. 6a and 6b, the synchronization routine 106 shall be described. At decision step 380, it is determined whether or not the synchronization input on line 74 to input module 24 of FIG. 1 has been activated during a period while the monitor off signal on line 72 is inactive. If so, then the synchronization routine processing continues at process step 382 where the synchronization flag is set. If not, then the processing continues on the no side of decision step 380 to skip process step 382 and processing in either event continues at decision step 384. Decision step 384 determines whether or not the signature mode permission is active. If so, synchronization routine processing continues at decision step 386 which determines whether or not the current pass through the synchronization routine is the first pass of the current execution of the machine cycle of operation. If so, the signature synchronization store pointer is initialized by process step 388. If not, process step 388 is skipped and synchronization routine processing continues at decision step 390. Decision step 390 determines whether or not the machine cycle of operation is continuing to be executed; if it is, then processing of the synchronization routine continues at decision step 392 where the state of the synchronization flag is tested. If true, then the present values for time and scan are loaded into the signature synchronizations store arrays at the locations identified by the array pointer thus producing and storing synchronization time signals representing times at which synchronization signals are input to the monitor. Thereafter, at process step 396, the synchronization flag is reset and at process step 398 the synchronization pointer is incremented.

At decision step 400, the synchronization pointer is tested against its associated limit and if greater than its limit, process step 402 sets the error output signal on. If the pointer is less than the limit, then the synchronization routine processing continues by the on page connector A1 to decision step 380. Repeated scans through the monitor programs will resume operation of this part of the synchronization routine within the loop created by the on page connector A1 until decision step 390 determines that the machine cycle of operation has been terminated. Once the decision step 390 determines the machine cycle of operation has been terminated, the synchronization routine processing continues at process step 404 where the current values for the time and the scan count are loaded into the signature synchronization store locations indicated by the pointer. Thereafter, overall monitor operation processing continues through terminal 406 at process step 150 of FIG. 2.

If it is determined at decision step 384 of FIG. 6a that the signature routine permission is not true, then the signature routine Processing continues at decision 410 where it is determined whether or not the base or monitor routine permissions are true. If either the base or monitor permissions are true, then synchronization routine processing continues at decision step 412 to determine whether or not this is the first scan of this execution of the machine cycle of operation. If it is, the base or monitor synchronization store pointer is initialized by process step 414. If this were not the first pass through the synchronization routine for this execution of the machine cycle, then process step 414 would be skipped and the synchronization routine processing in either event continues at decision step 416.

Decision step 416 determines whether or not the machine cycle of operation has been completed. If it has not, processing of the synchronization routine continues through the off page connector B1 to decision step 418 where it is determined whether or not the current value of the time and scan counters are equal to the values stored in the signature synchronization store at the locations indicated by the signature synchronization store index. If the current value of time is equal to the stored value identified by the signature synchronization store pointer, then process step 420 sets the synchronization wait variable true to cause the synchronization routine processing to wait for the occurrence of a synchronization input. If decision step 418 determines that the current time value is not equal to the value in the signature synchronization store array identified by the array index, then process step 420 and the wait loop established by decision step 422 are skipped and processing continues at decision step 424.

Decision step 424 determines whether or not the end of program has been reached and if it has, the synchronization wait variable is reset by process step 426. If the end of program has not been reached, processing continues at decision step 428 where the test is made for the synchronization flag. If the synchronization flag is set, then process step 430 stores the current values of time in the base-monitor synchronization store array at the location indicated by the array pointer. Thereafter, decision step 432 determines whether or not the synchronization wait variable is still true. If the synchronization wait variable is not true then process step 434 loads the time counters with the values from the signature synchronization store indicated by the store array index.

In this fashion, if the time has not been reached for the occurrence of a syncnronization pulse as predicted by the value stored in the signature synchronization store arrays then the occurrence of a synchronization pulse forces the current values of the time and count variables to the time value corresponding to the occurrence of the next synchronization pulse in the signature run. Thereafter, at process step 436 the synchronization wait variable is reset and at process step 438 the synchronization store array index is incremented. If the synchronization flag had not been set, decision step 428 would have effected the skipping of steps 430 through 438 and in either event, processing would continue through the off page connector A1 to decision step 380 of FIG. 6a. Once the end of program is reached as determined by decision step 416, processing would continue at decision step 440 where it is determined whether or not the base permission is active. If the base permission is not active, the overall monitor operation processing is continued through terminal 406 at process step 150 of FIG. 2.

Continuing with reference to FIG. 6a, had decision step 440 determined at the end of the machine cycle of operation that the base load routine permission were true, then processing would continue at process step 442 where the current values of time are loaded into the base-monitor synchronization store array at the location indicated by the array pointer. Thereafter, the processing of the synchronization routine would continue through the off page connector B2, to process step 444 on FIG. 6b. At this point, the execution of the machine programmed cycle of operation in the base mode has been completed and adjustments will be made in the limit array data to correct for time changes resulting from the synchronization routine.

While executing the machine cycle of operation in the base mode, the load level sample values are stored in the limit array at locations identified by the time counter. These sample values will be replaced with computed limit values during execution of the limit calculation routine. To identify the array abberations resulting from synchronization, i.e., instances in which time values are set to synchronization values in response to the synchronization input signal, an array index is initialized at process step 444. At process step 446, the processing variable is set true. At decision step 448, the index is tested against the base mode synchronization store pointer incremented during the base or monitor mode machine cycle executions. If the index is less than the pointer, processing continues at process step 450 where the input channel index is initialized. The input channel index is used to select data from one of the inputs to the analogue to digital converter of input module 20 of FIG. 1. Each channel is associated with a machine member driving means.

At decision step 452, the synchronization store values of the signature synchronization store and base monitor synchronization store identified by the index initialized at step 444 are compared for equality. If unequal, a synchronization of values is required and processing continues at process step 454. Process step 454 effects the comparison of three limit values within the limit array. The three values include the value corresponding to the signature synchronization time, the base-monitor synchronization time and the value previous to the base-monitor synchronization time. Process step 456 loads the identified channel limit with the least of these three values at the limit array location corresponding to the signature synchronization time identified by the index. Process step 458 calculates a skew between the signature and base-monitor synchronization times to establish a span of values within which adjustments must be made. Decision step 460 determines whether or not the skew calculated in process step 458 is greater than or equal to 1. If decision step 460 determines that the skew is greater than or equal to 1, processing continues at process step 462 where a comparison of the values within the span are made to determined the minimum value. Thereafter, processing continues at process step 464 to load the limit array with the identified minimum value up to the entry corresponding to the signature synchronization store time. If the skew had been found not to be greater than or equal to 1 then processing from decision step 460 would proceed at decision step 466 where it is determined whether or not the channel index is equal to the last channel. If it is not, processing continues at process step 468 which increments the channel index and thereafter through the on page connector B5 to process step 454.

When the decision step 466 determines that the channel index has reached the last channel, then processing continues from the on page connector B4 to process step 470. Process step 470 increments the synchronization store index and the processing continues through the on page connector B3 to decision step 448. If will be appreciated that the effect of the process steps beginning at process step 444 is to load values in the limit array to accommodate abberations resulting from synchronization processing. If it had been determined at decision step 448 that the index were no longer less than the base pointer, then processing would have continued at process step 472 to set the calculation routine permission on. Thereafter, overall monitor operation processing would continue through the terminal 474 to process step 150 of FIG. 2.

Figure 8:
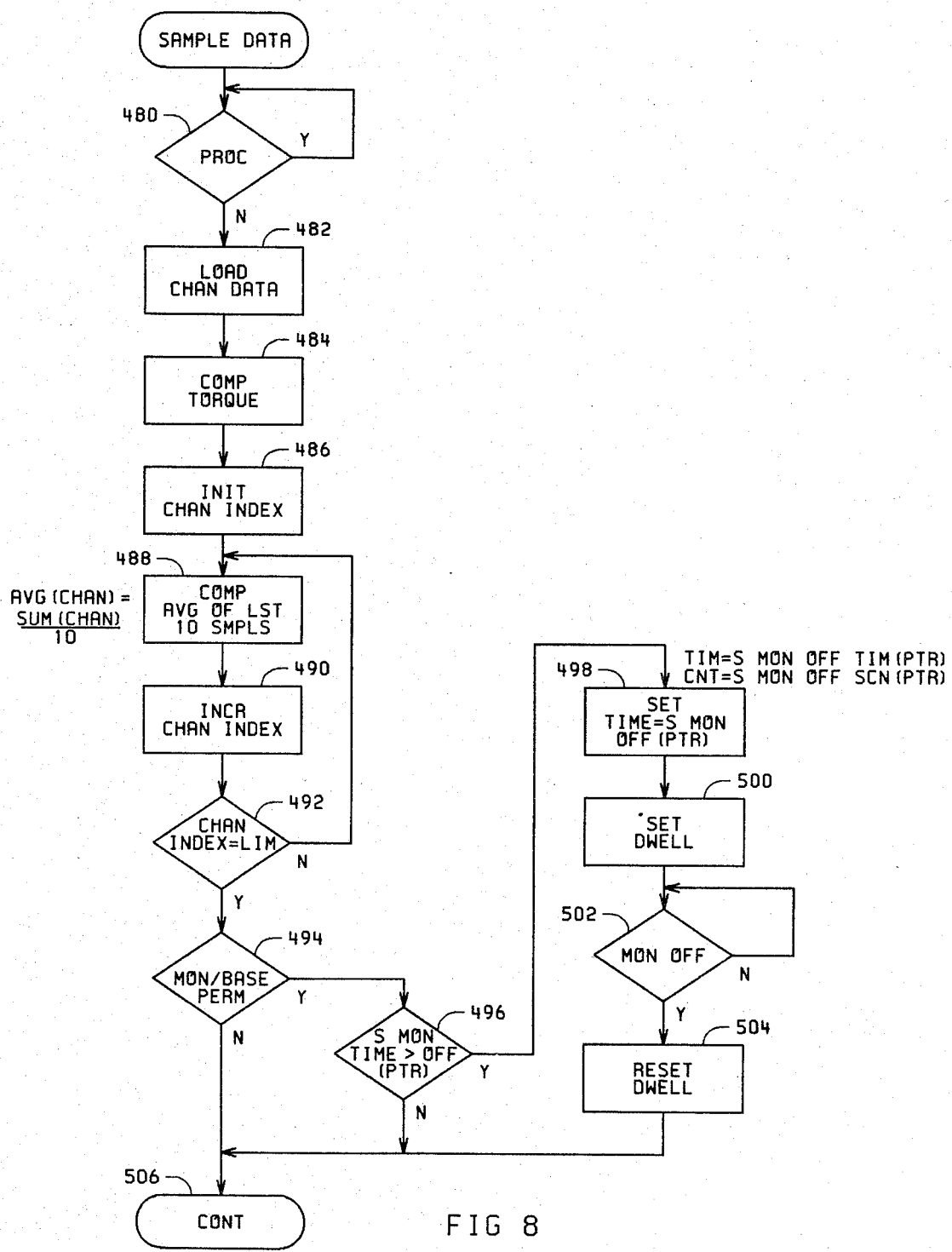
FIG. 8 is a flow chart of the data sampling routine of FIG. 2.

Referring now to FIG. 8, the sample data routine 108 shall be described in detail. Data samples are not taken while monitor operation is in a processing activity. Therefore, the decision step 480 establishes a wait condition for the deactivation of the processing variable. At process step 482, channel data selected by a channel index from the analogue-to-digital input module 20 is loaded into a temporary store. At process step 484, a spindle torque is calculated as the quotient of spindle drive means power divided by the spindle speed. At process step 486, the channel index is initialized and at process step 488 the average value of the last ten samples of channel input data is computed. At process step 490, the channel index is incremented and at decision step 492, if the channel index is not equal to its limit, processing is directed in a loop back to process step 488. Once the channel index limit is reached as determined by decision step 492, processing continues at decision step 494 where the test is made to determined whether the base or monitor mode permissions are active. If either are active, processing continues at decision step 496. Decision step 496 determines whether or not the current value of time is greater than the signature monitor off time identified by the value of the monitor off array index, the index value depending on the monitor off routine 104. If it is, processing continues at process step 498 where the time is forced equal to the signature monitor off time indicated by the pointer and at process step 500 a dwell is set on. Decision step 502 is a wait condition waiting for the occurrence of the monitor off predicted by the signature monitor off index and upon the actuation of the monitor off signal. Process step 504 resets the dwell. In the event decision step 496 determines the time was not greater than the signature monitor off time, the process steps 498 through 504 would be skipped and overall monitor operation would be continued through terminal 506. This would bring monitor operation processing to process step 152 of FIG. 2.

Figure 9:
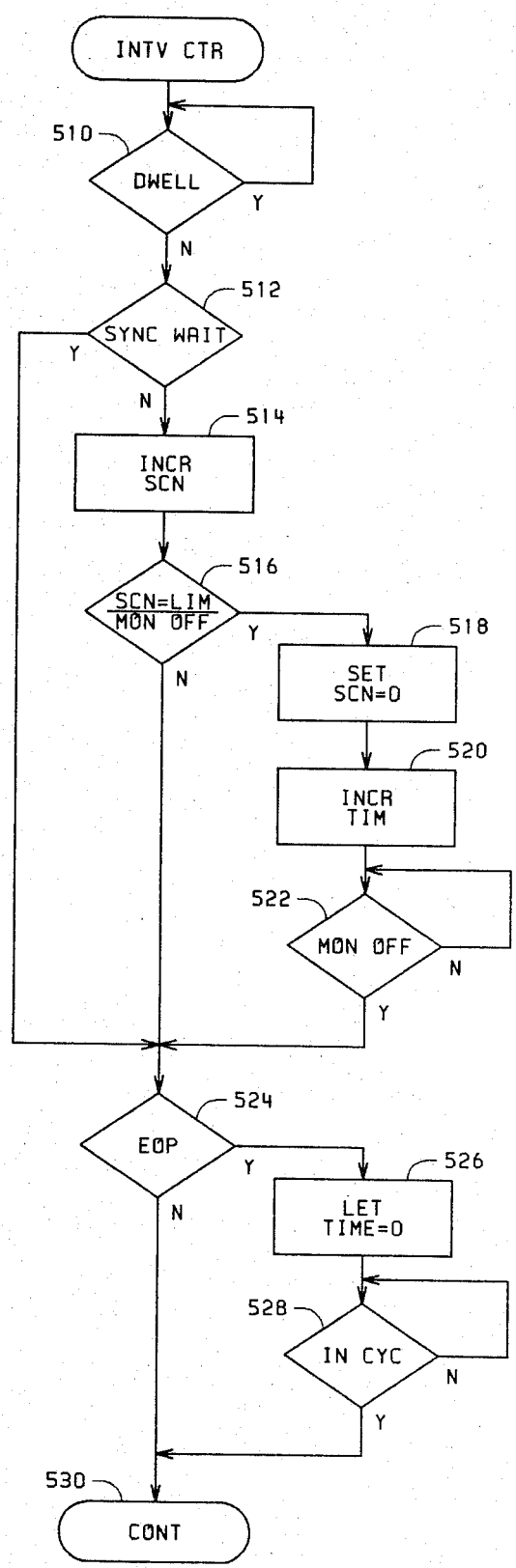
FIG. 9 is a flow chart of the periodic interval counting routine of FIG. 2.

Referring now to FIG. 9, the interval counter routine 110 will be described in detail. As has been previously stated, if any monitor program processing is suspended, then the programmable controller operating system effects the execution of instructions in the next active monitor program from the program list. Had the dwell been set by the sample data routine at process step 500, and a monitor off not occurred then it is conceivable that the interval counter processing routine could be initiated during a dwell interval. Therefore, decision step 510 establishes a wait condition for the termination of the dwell period. Thereafter, decision step 512 determines whether or not the monitor operation is in a synchronization wait initiated by process step 420 of the synchronization routine of FIG. 6b. If not in a synchronization wait, process step 514 increments the scan counter. Decision step 516 tests the scan counter against its associated limit. If the scan counter is equal to the limit or if the monitor off condition is true, process step 518 sets the scan counter equal to zero and process step 520 increments the time counter. Thereafter, decision step 522 creates a wait loop for the monitor off condition to be terminated. Upon termination of the monitor off condition, processing continues at decision step 524 where the occurrence of the end of program is tested. If decision step 512 had determined that the synchronization wait variable were true, then steps 514 through 522 would have been skipped. The suspension of execution of the interval counter routine during the pendency of the synchronization wait signal inhibits the generation of new data storage values for the load level arrays and forces the base or monitor mode time to equality with the signature mode time at the instant of the synchronization signal.

If the end of program has occurred as determined by decision step 524, processing continues at process step 526 where the time counter is set equal to zero. Thereafter, the decision step 528 establishes a wait condition for the initiation of another execution of the machine cycle of operation. If decision step 524 had determined that the end of the program had not occurred, then processing would continue through terminal 530 to bring the overall monitor operation processing to decision step 156 of FIG. 2. Decision step 156 determines whether or not the calculation routine should be executed, and if so, then the overall monitor operation continues at process step 158 with the execution of the calculation routine.

The calculation routine will be described with reference to FIGS. 7a and 7b. The purpose of the calculation routine is to compute limit values based upon an algorithm using net force or torque as determined by the difference between samples of driving means load levels taken during the signature mode of operation and samples of the same driving means load levels taken during the base mode of operation. As has been previously indicated, the monitor is effective for determining extreme load values of torque or force and is therefore suitable for application to machine spindles as well as machine movable member slide drives. The same limit calculation algorithm can be used for machine member slide drives as well as spindle drives. The algorithm is expressed as:

$$\text{Limit} = B + (1+G)(|S-B_m|+N)+N$$

B = base load level
G = worn tool gain factor
S = signature load level
$B_m$ = minimum base load level
N = empirical deviation factor The base and signature load levels are the measured values at a selected interval time. The gain value is determined empirically to account for force increases associated with tool wear. Values are selected to include the greatest number of values measured in actual machining runs wherein the force changes corresponded to a determination that the tools were worn out. A different gain value is used for each machine movable member. The empirical deviation values are determined for a particular machine type by exercising the machine and comparing measured force values over a number of repeated cycles of operation. These deviation values then represent the expected changes of load for the machine cycling while not performing work on a workpiece. Each machine movable member has an associated deviation value. The base minimum value is selected within a window of array values close to the identified sample time and represents the minimum value of the base load level within that window. The quantity within the absolute value bracket constitutes a net load. Difference signals representing the unsigned load level difference between the base and signature loads define the force or torque required to perform work on the workpiece.

Figure 7A:
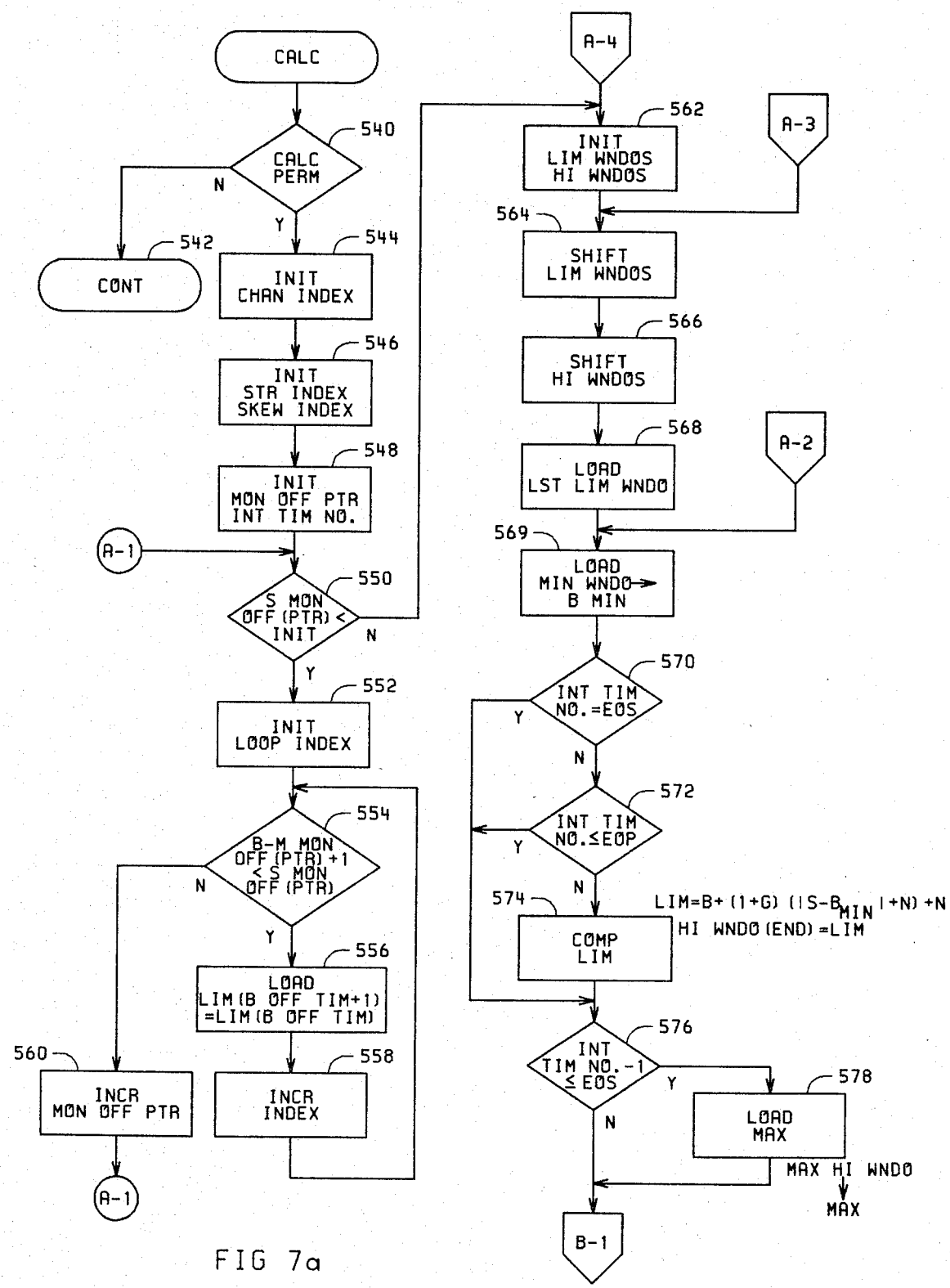
FIGS. 7a and 7b are flow charts of a calculation routine used to compute the periodic interval load limits.
Figure 7B:
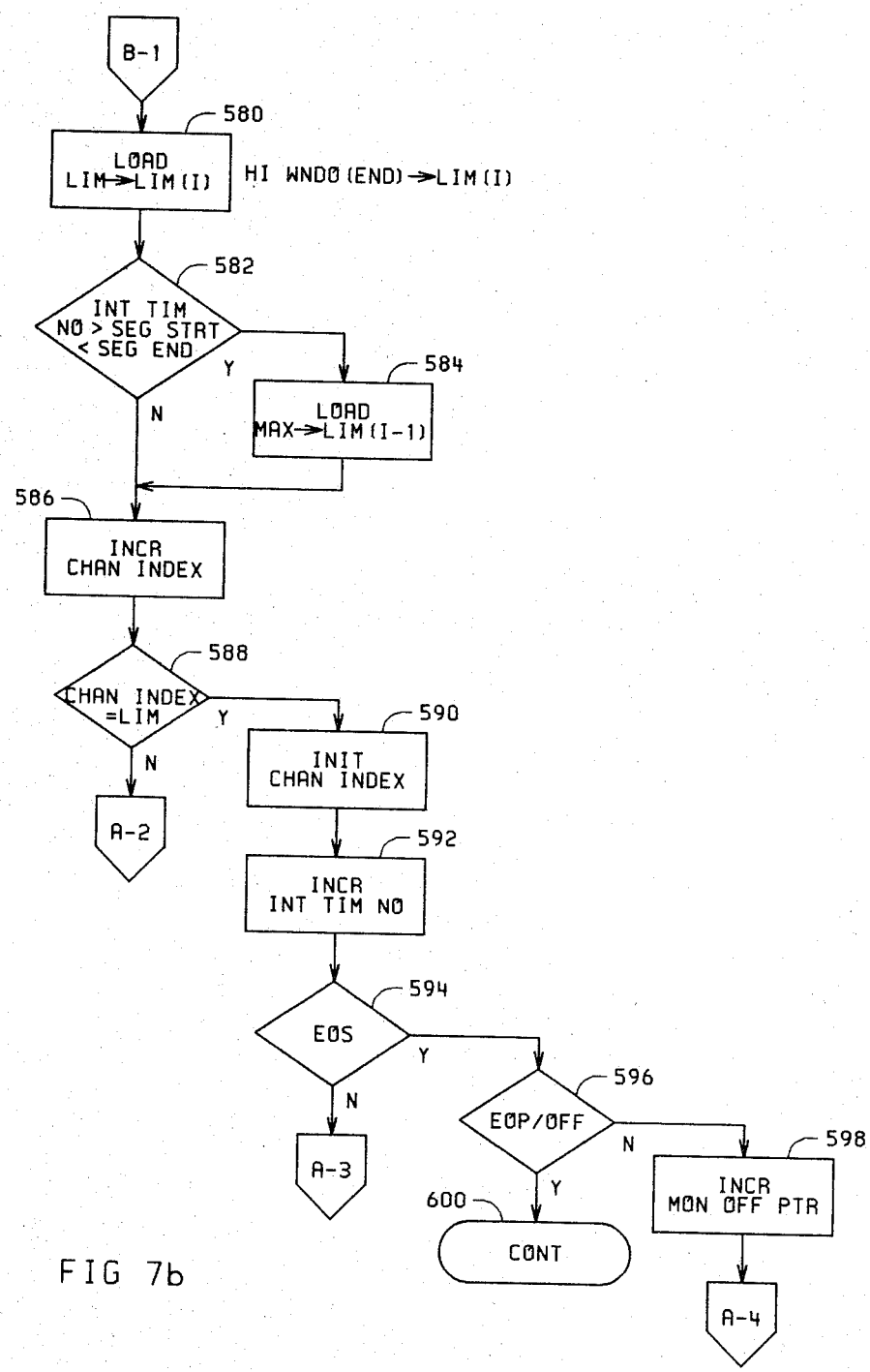

Referring now to FIG. 7a, decision step 540 determines whether or not the calculation routine permission has been set on. If not, overall monitor operation processing is continued through terminal 542. Assuming the calculation routine permission is on, process step 544 initializes the channel index. Process step 546 initializes the array index and a skew variable. Process step 548 initializes the monitor off pointer and the interval time number index. At decision step 550, the signature monitor off time identified by the pointer is tested against the storage location initialization value. If it is less than the initialization value, indicating that a monitor off signal was received, processing continues at process step 552 where a processing loop index is initialized. At decision step 554, the time recorded in the base monitor off store identified by the monitor off pointer is compared against the value in the signature monitor off store identified by the same pointer. If the value in the signature monitor off store is equal to or greater than one more than the base monitor off store, then the result of decision step 554 is a yes and processing continues at process step 556. This routine accommodates time shifts effected by the occurrence of monitor off signals. Process step 556 loads the limit value identified by the next time following the selected monitor off time with the value identified by the monitor off time. Process step 558 increments the loop index and loop execution continues until decision step 554 determines that the time differential is less than 1. Thereafter, process step 560 increments the monitor off pointer. Processing then continues through the on page connector A1 to decision step 550.

The data arrays are divided into segments identified by the occurrence of the monitor off signals and once the last of the monitor off times has been identified, decision step 550 will produce a no result. Processing thereafter will continue at process step 562. Process step 562 initializes the limit windows for all input channels and the high end window for all input channels used in identifying the minimum base load level near the selected sample point. The limit window and high windows span three elements of the limit arrays. Process step 564 shifts the array data in the limit windows one element in the direction of the first element of the arrays. Process step 566 shifts the array data in the high windows one element in the direction of the first element of the arrays. Process step 568 loads the last element of the limit window with the array entry from the next element in the array beyond the window. The effect of steps 564 and 568 is to move the window through the array toward the last array entry. Process step 569 loads the minimum value within the window into the base minimum temporary store. Decision step 570 determines whether the current interval time number identifying the sample time corresponds to the end of a segment defined by the monitor off signal. If it does not, decision step 572 determines whether the current interval time number corresponds to the end of the program of the machine cycle of operation. If it does not, process step 574 computes the limit value in accordance with the algorithm set forth and described previously. The result is held in the last location of the high window.

Following the limit computation, decision step 576 determines whether the interval time number minus 1 is less than or equal to the time value corresponding to the end of the segment and if it is, process step 578 loads the maximum value found in the high window into the maximum temporary store. Thereafter, calculation routine processing continues through the off page connector B1 to process step 580 of FIG. 7b where the calculated limit value is loaded into the limit array location identified by the interval time number. Decision step 582 determines whether or not the current interval time number is within the span of times defined by the segment described by the monitor off time identified by the monitor off pointer. If the current interval time number is within the segment, process step 584 loads the value temporarily stored in the max location into the limit array location identified by the interval time number one less than the current interval time number. The effect of process steps 578 and 584 is to store the maximum of the last three calculated limit values in the limit array location preceding the location indicated by the current interval time number. This effectively eliminates large limit changes from one interval time to another.

Process step 586 increments the channel index. Decision step 588 determines whether the channel index is equal to its limit and if not, the calculation routine processing continues through the off page connector A2 to process step 569 of FIG. 7a. If the decision step 588 determines that the channel index is equal to its limit, processing continues at process step 590 where the channel index is initialized. Thereafter, at process step 592, the interval time number is incremented. At decision step 594 the interval time number is tested to determine whether or not it corresponds to the end of a segment; it if does not, the calculation routine processing continues through the off page connector A3 to process step 564 of FIG. 7a. If decision step 594 of FIG. 7b determines that the interval time number corresponds to the end of a segment then the processing continues at decision step 596 where it is determined whether or not the segment end corresponds to a termination of the machine cycle of operation or the resetting of the monitor operation. If it does not, process step 598 increments the monitor off pointer and calculation routine processing continues through the off page connector A4 at process step 562 of FIG. 7a. If decision step 596 determines that the reference number has reached the end of the program, then the overall monitor operation process continues through the terminal 600 at processing step 154 of FIG. 2.

Upon completion of execution of the calculation routine the limit array will be filled with limit values corresponding to the time interval periods. A limit value is calculated and stored for each ten load level samples using the average values computed by the sample data routine. Keeping in mind that samples are taken every 100 milliseconds so long as the monitor operation has not been suspended by a monitor off command or by a dwell, the limit values represent load level limits to be used in a limit test for each second of the execution of the machine cycle of operation. In this fashion, load level limits are established for all activities of the programmed machine cycle of operation irrespective of whether or not work is being performed on the workpiece. Thus, load level limits exist for periods when slide motion is associated with positioning prior to actual workpiece machining. In the event a wreck or interference condition occurs during periods of machine cycle operation other than those anticipated to be associated with machining of the workpiece, the load level limits enable the monitor to detect excessive load levels in machine member diving means and to set the error output automatically.

The limit test routine 114 shall be described with reference to FIG. 10. The limit test routine is called by any one of the mode routines and effects the storage of load level signals for the calculation routine and the comparison of sample load level values against the limit values identified by the interval counter. It will be understood that in the signature and base modes, a single execution of the machine program cycle of operation is necessary to establish the signature and base load level values. During execution of the programmed machine cycle of operation in the signature mode, the limit test routine loads the signature load level array with the larger of the running average or the previous stored signature value. During the execution of the programmed machine cycle of operation in the base mode, the limit array is loaded with the lesser of the running average or previous stored value. When the machine cycle of operation is executed in either the display or Protect monitor mode, the load level average for each channel is compared against a selected load level limit and if the load level average is greater than 100% of the load level limit the error output is set on.

Figure 10:
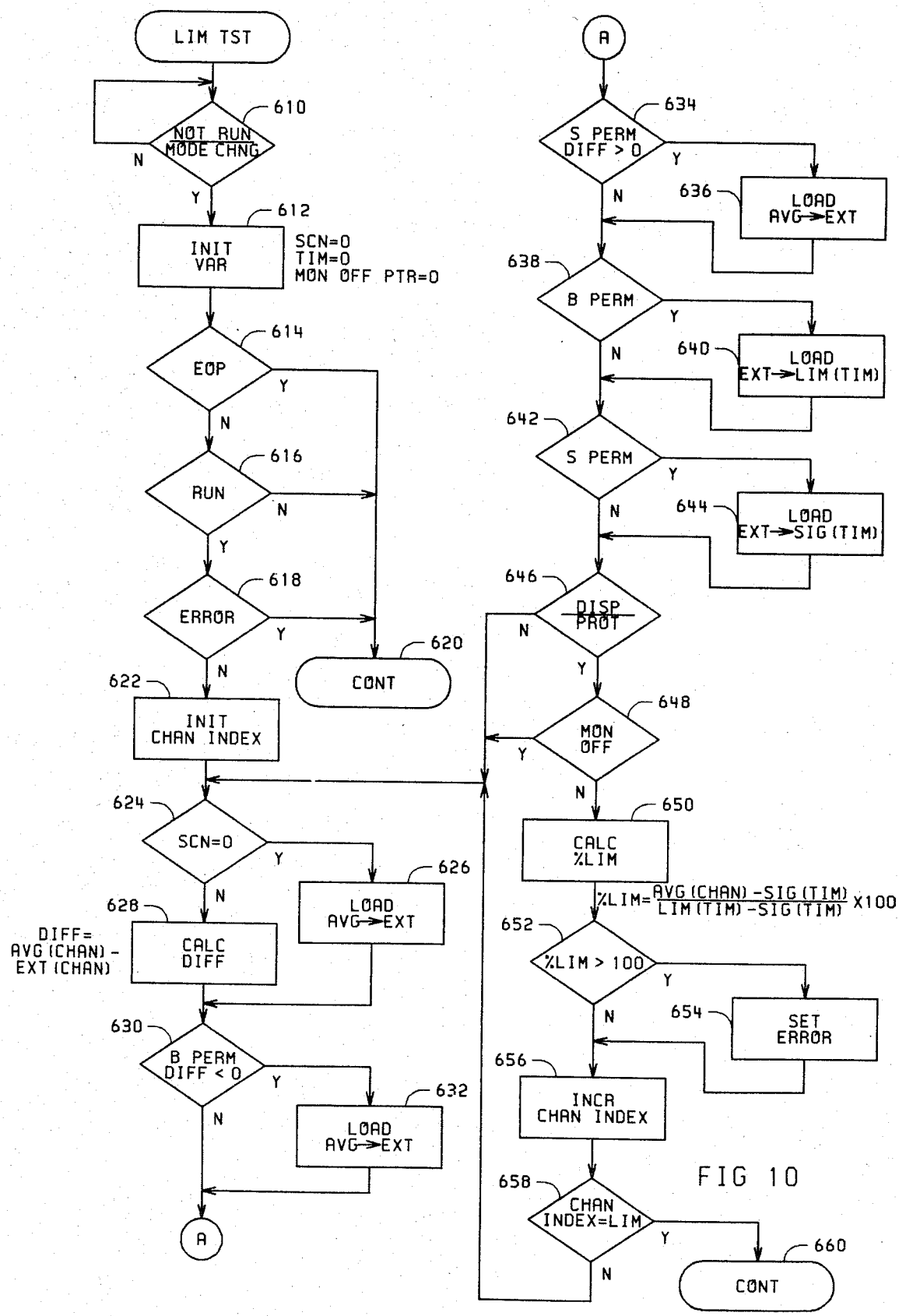
FIG. 10 is a flow chart of the limit test routine called by the mode control routines of FIGS. 4a, 4b, and 4c.

Referring to FIG. 10 the limit test routine processing begins at decision step 16 which establishes a wait loop inhibiting execution of the limit test routine until the deactivation of the monitor run signal or the activation of a monitor mode change signal. Keeping in mind that the limit test routine is called by one of the mode routines, either of these activities is an indication that the machine cycle of operation is about to begin. At process step 612, values for the scan count, time count, and monitor off pointer are initialized. At decision step 614, the in cycle input for indicating that the machine cycle of operation is being executed is tested. If the machine cycle of operation is being executed, processing continues at decision step 616 which determines whether or not the run variable is set. Provided the run variable is set, processing continues at decision step 618 which determines whether or not the error output has been set. If the error output has not been set, processing continues at process step 622 which initializes the input channel index. If any of the tests of decision steps 614 through 618 result in the necessary condition not being met, then processing of the limit test routine is terminated and processing of the calling mode routine is resumed through the terminal 620.

At decision step 624, the scan counter is tested for equality with zero, corresponding to the scan count at which the time counter is updated and at which an average sample value will be stored. If the scan counter is equal to zero, process step 626 loads the average value into the temporary storage location extreme. If the scan counter is not equal to zero, process step 628 computes the difference between the value of the extreme temporary variable and the current value of the selected channel sample average. At decision step 630, the test is made to determine whether or not the base routine permission is active and if the difference computed at process step 628 is less than zero. Provided both these conditions are met, process step 632 loads the average value into the extreme temporary store. The effect of the decision step 630 and processing step 632 insures that the value stored temporarily in the extreme variable location for each input channel is the minimum of the average values computed during the last ten scans. At decision step 634, a similar test and process step are executed for the signature mode where the signature routine permission is tested and the difference is tested for being greater than zero to insure the maximum average value of the consecutive average values is stored. If both these conditions are met, then processing step 636 loads the average value into the extreme variable location. At decision step 638, the base routine permission is tested again, and if active, process step 640 loads the selected channel extreme value identified by the time counter into the limit array at the location identified by the time counter. In a similar manner, decision step 642 and process step 644 determine whether or not the machine cycle of operation is being executed in the signature mode. If so, process step 644 loads the selected input channel extreme value identified by the time counter into the signature array location identified by the time counter.

At decision step 646, the display or protect permissions are tested. If either are true, processing continues at decision step 648 to determine whether or not the monitor off input is active. If neither display or protect permissions are true, or if the monitor off input is active, processing of the limit test routine would be suspended and overall monitor operation processing would be resumed through terminal 660. Assuming that the active mode is the display or protect mode, and the monitor off input is not active, processing continues at process step 650 where the percentage of the limit value is computed. At decision step 652 the percentage limit is tested against 100% and if greater than 100%, process step 654 sets the error output on. As long as the computed percentage limit is less than or equal to 100%, the monitor operation can continue at process step 656 which increments the input channel index. Decision step 658 tests the channel index against its associated limit, and if less than its associated limit, the limit test routine is continued at decision step 624 to complete the data storage and limit testing for all input channels. Once decision step 658 determines that the channel index is equal to its limit, the limit test processing of this scan is complete and overall monitor operation processing continues through terminal 660.

It will be appreciated by those skilled in the art that the limit test routine is executed with each update of the scan counter so long as the machine cycle of operation is being executed and the monitor is in a run condition and the error output has not been set on. The function performed by the limit test routine depends on the mode active at the time of its execution. Termination of the limit test routine processing through terminal 620 or 660 effects the advance of processing of the calling mode routine.

It should now be appreciated that once the signature and base load level values are stored, subsequent executions of the programmed machine cycle of operation in the monitor mode may be completed subject to limit testing so long as the increased load levels from tool wear do not exceed the load level increase anticipated by the limit calculation algorithm. Assuming that the error output is not set due to tool breakage or another malfunction of the execution of the machine cycle of operation, the limit algorithm may be used to detect excessive tool wear.

While the invention has been described with reference to the preferred embodiment, and while this preferred embodiment has been described in considerable detail, it is not intended thereby to limit the invention to such detail. On the contrary, it is intended to cover all modifications, alterations, and equivalents falling within the spirit and scope of the appended claims.

What is claimed is:

1. Apparatus for detecting a malfunction during an execution of a machine cycle of operation, the machine having at least one movable member driven by driving means for effecting relative motion between a workpiece and a tool, the apparatus comprising:
   (a) means for periodically producing load level signals during an execution of the machine cycle of operation, each load level signal representing a driving means load level;
   (b) means for storing signature load level signals produced during a first execution of the machine cycle of operation when a workpiece is present;
   (c) means for storing base load level signals produced during a second execution of the machine cycle of operation when a workpiece is not present;
   (d) means responsive to the signature load level signals and the base load level signals for producing limit signals, each limit signal representing a load level defining an acceptable maximum driving means load for a predetermined interval occuring during an execution of the machine cycle of operation;
   (e) means for comparing load level signals produced during subsequent executions of the machine cycle of operation to the limit signals; and
   (f) means responsive to the comparing means for producing an error output signal when a load level signal exceeds a limit signal.

2. The apparatus of claim 1 wherein the machine has a plurality of movable members and driving means and the means for producing load level signals further comprises:
   (a) means for sampling the load level of each driving means; and
   (b) means responsive to the sampling means for producing channel load level signals representing the periodic load level of each driving means.

3. The apparatus of claim 2 wherein the limit signal producing means produces limit signals for each driving means.

4. The apparatus of claim 2 wherein one of the machine movable members is a spindle and the load level producing means further comprises means for producing a torque level signal.

5. The apparatus of claim 1 wherein the limit signal producing means further comprises:
   (a) means for computing difference signals representing the load level difference between the base and signature load levels; and
   (b) means responsive to the difference signals for producing the limit signals.

6. Apparatus for detecting a malfunction during an execution of a machine cycle of operation, the machine having at least one movable member driven by driving means for effecting relative motion between a workpiece and a tool, the cycle of operation being executed in response to a program including synchronization codes for producing synchronization signals, the apparatus comprising:
   (a) interval counting means for producing periodic interval signals representing times at which driving means load level samples are to be taken during an execution of the machine cycle of operation;
   (b) means responsive to the periodic interval signals for periodically producing load level signals, each load level signal representing a driving means load level occurring at a time defined by a periodic interval signal;
   (c) means for storing signature load level signals produced during a first execution of the machine cycle of operation when a workpiece is present;
   (d) means for storing base load level signals produced during a second execution of the machine cycle of operation when a workpiece is not present;
   (e) means responsive to the signature load level signals and the base load level signals for producing limit signals, each limit signal representing a load level defining an acceptable maximum load for a predetermined interval occurring during an execution of the machine cycle of operations;
   (f) means for comparing load level signals produced during subsequent executions of the machine cycle of operation to the limit signals; and
   (g) means responsive to the comparing means for producing an error output signal when a load level signal exceeds a limit signal.

7. The apparatus of claim 6 wherein the limit signal producing means further comprises:
   (a) means for computing difference signals representing the load level difference between the base and signature load levels; and
   (b) means responsive to the difference signals for producing the limit signals.

8. The apparatus of claim 7 further comprising:
   (a) means responsive to the counting means and the synchronization signals for producing synchronization time signals during the first execution of the machine cycle;
   (b) means for storing the synchronization time signals; and
   (c) means responsive to the stored synchronization time signals and the synchronization signals for setting the value of the periodic interval signal during the subsequent executions of the machine cycle.

9. The apparatus of claim 7 wherein the means for storing base load signals stores a base load signal representing a minimum value occurring during the predetermined interval and the means for storing the signature load signals stores a signature load signal representing a maximum value occurring during the predetermined interval.

10. Apparatus for detecting a malfunction during an execution of a machine cycle of operation, the machine having at least one movable member driven by driving means for effecting relative motion between a workpiece and a tool, the cycle of operation being controlled by a machine control executing a program including monitor inhibit command codes, the control outputting monitor off signals in response to the monitor inhibit commands, the apparatus comprising:

(a) interval counting means responsive to a monitor off signal for producing periodic interval signals representing times at which driving means load level samples are to be taken during an execution of the machine cycle of operation;

(b) means responsive to the periodic interval signals for periodically producing load level signals each load level signal representing a driving means load level occurring at the time defined by the interval signal;

(c) means for storing signature load level signals produced during a first execution of the machine cycle of operation when a workpiece is present;

(d) means for storing base load level signals produced during a second execution of the machine cycle of operation when a workpiece is not present;

(e) means responsive to the signature load level signals and the base load level signals for producing limit signals, each limit signal representing a load level defining an acceptable maximum driving means load for a predetermined interval occurring during an execution of the machine cycle of operation;

(f) means for comparing load level signals produced during subsequent executions of the machine cycle of operation to the limit signals; and (g) means responsive to the comparing means for producing an error output signal when a load level signal exceeds a limit signal.

* * * * *